United States Patent
Nielsen et al.

(10) Patent No.: US 11,649,630 B2
(45) Date of Patent: May 16, 2023

(54) THERMALLY ACTIVATED BUILDING PANEL

(71) Applicants: KVADRAT SOFT CELLS A/S, Ebeltoft (DK); PRICE INDUSTRIES LIMITED, Winnipeg (CA)

(72) Inventors: Jesper Nielsen, Charlottenlund (DK); Julian Douglas Tyldesley Rimmer, London (GB); Sylvio Tessier, Winnipeg (CA); Vasilios Andreas Oliver, St. Andrews (CA); Heng Liu, Winnipeg (CA); Troy Hicks, Winnipeg (CA); Tammy Lamoureux, Winnipeg (CA); Sean Jordan, Winnipeg (CA)

(73) Assignees: KVADRAT SOFT CELLS A/S, Ebeltoft (DK); PRICE INDUSTRIES LIMITED, Winnipeg (CA)

( * ) Notice: Subject to any disclaimer, the term of this patent is extended or adjusted under 35 U.S.C. 154(b) by 507 days.

(21) Appl. No.: 16/626,270

(22) PCT Filed: Jun. 28, 2017

(86) PCT No.: PCT/IB2017/053859
§ 371 (c)(1),
(2) Date: Dec. 23, 2019

(87) PCT Pub. No.: WO2019/002915
PCT Pub. Date: Jan. 3, 2019

(65) Prior Publication Data
US 2020/0115897 A1    Apr. 16, 2020

(51) Int. Cl.
*E04B 9/04*    (2006.01)
*D06M 11/83*    (2006.01)
(Continued)

(52) U.S. Cl.
CPC .............. *E04B 9/0428* (2013.01); *C25D 5/54* (2013.01); *C25D 7/00* (2013.01); *D06M 11/83* (2013.01);
(Continued)

(58) Field of Classification Search
CPC .... E04B 9/0428; E04B 9/0464; E04B 9/0421; E04B 2009/0492; D06M 11/83;
(Continued)

(56) References Cited

U.S. PATENT DOCUMENTS 3,833,046 A * 9/1974 Tombu .................... B44C 7/022
                                                    160/395
4,637,947 A * 1/1987 Maekawa ............... B32B 5/024
                                                    442/379
(Continued)

FOREIGN PATENT DOCUMENTS

CH          708008 A1 * 10/2014 ............. B23K 20/10
DE        1951130 U     12/1966
(Continued)

OTHER PUBLICATIONS

Machine Translation of JP 01-155128; https://www.j-platpat.inpit.go.jp/p0200; Apr. 23, 2022 (Year: 2022).*
(Continued)

*Primary Examiner* — Ryan D Kwiecinski
(74) *Attorney, Agent, or Firm* — Neal, Gerber & Eisenberg LLP; Thomas E. Williams (57) ABSTRACT

The thermally activated building panel (1) includes a metal plate (2) having a room-facing surface (3) and a building-facing surface (4). A heat-exchanger tube (5) for conveying a cooling or heating medium is in conductive thermal contact with the building-facing surface (4) of the metal plate (2). A textile (9) is arranged on the room-facing surface (3) of the metal plate (2) and has a first surface (10) generally
(Continued)

contacting the metal plate (2) and a second surface (11) generally visible from said room. The textile (9) is tensioned between opposed edges (12) of the metal plate (2). The first surface (10) of the textile (9) is metallized by deposition of metal particles on the textile (9).

15 Claims, 6 Drawing Sheets (51) Int. Cl.
*D06M 23/08* (2006.01)
*C25D 7/00* (2006.01)
*C25D 5/54* (2006.01)

(52) U.S. Cl.
CPC .......... *D06M 23/08* (2013.01); *E04B 9/0464* (2013.01); *E04B 2009/0492* (2013.01)

(58) Field of Classification Search
CPC .......... D06M 23/08; F24D 3/14; F24D 3/145; F24D 3/148; F24D 3/16; F24D 3/165; F24F 5/0092
See application file for complete search history.

(56) References Cited

U.S. PATENT DOCUMENTS

| | | | | |
|---|---|---|---|---|
| 8,561,677 | B2* | 10/2013 | Miyamura | F24F 5/0092 |
| | | | | 165/168 |
| 9,670,673 | B2* | 6/2017 | Bergman | E04B 9/303 |
| 9,745,748 | B2* | 8/2017 | Bergman | E04B 9/245 |
| 10,246,595 | B2* | 4/2019 | Kalita | C09K 21/04 |
| 10,731,342 | B2* | 8/2020 | Nielsen | E04B 9/0428 |
| 11,091,909 | B2* | 8/2021 | Riiber | E04F 13/005 |
| 2005/0045317 | A1 | 3/2005 | Huebner et al. | |
| 2005/0211500 | A1* | 9/2005 | Wendt | E04B 9/0464 |
| | | | | 181/290 |
| 2013/0122769 | A1 | 5/2013 | Brabbs et al. | |
| 2019/0242123 | A1* | 8/2019 | Kouijzer | F21V 7/0041 |
| 2020/0115897 | A1* | 4/2020 | Nielsen | C25D 5/54 |
| 2020/0149748 | A1* | 5/2020 | Longo | E01C 11/26 |
| 2021/0285207 | A1* | 9/2021 | Zuo | E04B 9/045 |
| 2021/0355681 | A1* | 11/2021 | Baggs | E04D 13/006 |

FOREIGN PATENT DOCUMENTS

| | | | | |
|---|---|---|---|---|
| DE | 4335654 | A1 | 4/1995 | |
| DE | 20011751 | U1 * | 10/2000 | ............... E04B 9/02 |
| DE | 202005010524 | U1 | 9/2005 | |
| DE | 102010039331 | A1 | 2/2012 | |
| EP | 0299909 | A1 | 1/1989 | |
| EP | 0452558 | A1 | 10/1991 | |
| FR | 2633380 | A1 | 12/1989 | |
| GB | 796138 | A | 6/1958 | |
| JP | S5177820 | U | 6/1976 | |
| JP | S60140829 | U | 9/1985 | |
| JP | H01155128 | A | 6/1989 | |
| JP | 2007-530831 | | 11/2007 | |
| JP | 2008192792 | A * | 8/2008 | |
| WO | 2005/094317 | | 10/2005 | |
| WO | WO-2011033324 | A1 * | 3/2011 | ............. F24D 3/165 |
| WO | WO-2018206998 | A1 * | 11/2018 | ........... E04B 9/0428 |

OTHER PUBLICATIONS

Machine Translation of JP 60-140829; https://www.j-platpat.inpit.go.jp/p0200; Apr. 23, 2022 (Year: 2022).*
Japanese Patent Office, Office Action for Japanese Patent Application No. 2019-572709 (English translation) (dated Mar. 31, 2021) (3 pages).
European Patent Office, International Search Report in International Application No. PCT/IB2017/053859 (dated Mar. 22, 2018).
European Patent Office, Written Opinion of the International Search Authority in International Application No. PCT/IB2017/053859 (dated Mar. 22, 2018).

* cited by examiner

THERMALLY ACTIVATED BUILDING PANEL

The present invention relates to a thermally activated building panel adapted to be mounted at a ceiling or wall of a room and including a metal plate having a room-facing surface and a building-facing surface, wherein a heat-exchanger tube for conveying a cooling or heating medium is in conductive thermal contact with the building-facing surface of the metal plate, and wherein a textile is arranged on the room-facing surface of the metal plate, the textile having a first surface generally contacting the metal plate and a second surface generally visible from said room.

EP 0 299 909 A1 discloses a thermal ceiling panel consisting of metal plates and a supporting structure which carries flexible tubes through which a heating or cooling medium flows in order to achieve a desired room temperature. The tubes are mat-shaped and lie loosely and directly on the metal plates. A plurality of circular perforations for sound passage is formed in the metal plate, and a sound-absorbing layer in the form of a mat is placed directly on the metal plate or on the flexible tubes. Improved sound insulation may also be achieved in that a sound-absorbing microporous layer is applied to the underside of the metal plates provided with punched-out portions, which layer virtually does not hinder the air passage. However, the thermal conduction between the sound-absorbing microporous layer and the metal plate may be relatively low, and therefore the efficiency of the thermal ceiling panel may be reduced by application of the sound-absorbing microporous layer. Furthermore, as the sound-absorbing microporous layer abuts the surface of the metal plate, it may be difficult or even impossible to avoid that the edge of the circular perforations in the metal plate affects the surface of the sound-absorbing microporous layer so that the circular perforations are visible through the sound-absorbing microporous layer. In addition, as light to some degree is transmitted through the sound-absorbing microporous layer, the transmitted light will be reflected by the metal plate back through the sound-absorbing microporous layer. However, light will be reflected in a different way at the circular perforations in the metal plate, and therefore the circular perforations will also for this reason be visible through the sound-absorbing microporous layer. The aesthetic appearance of the thermal ceiling panel may thereby be negatively affected.

DE 43 35 654 A1 discloses a thin sheet fastened on the upper surface of a room ceiling comprising perforated metal panels. Said sheet reduces the acoustic damping only to a very small extent and increases the fire resistance of the room ceiling considerably. If the sheet is not fastened in the direct vicinity of the perforations in the metal panels or is expanded or elongated slightly in the region of the perforations, then there is virtually no reduction in the acoustic damping. This elongation can be obtained by driving with a foam roll over the glued-on sheet, the sheet thereby being pressed somewhat into the holes and thereby being plastically stretched. If desired, the foam roll can subsequently also be moved over the underside of the metal panel so that the sheet is pushed up again, but the elongation is retained. Plastic pipes with heating or cooling medium running through them can run over the sheet. The sheet then serves additionally as a screen for the plastic pipes. The plastic pipes can be assembled in mats or laid individually. They are attached to the film by means of a heat-conducting adhesive, and the adhesive between the film and the metal plate is preferably likewise heat-conducting, so that a good heat transfer occurs between the plastic pipes and the metal plate. For this purpose, the foil is also good heat-conducting and furthermore opaque, so that the plastic tubes are not visible through the holes. Aluminium meets these requirements. In order to achieve better heat radiation from the ceiling, the foil is provided with a colour coating on the underside. However, for reasons of aesthetic appearance, it may be a disadvantage that the perforated metal panels are freely exposed so that the perforations are visible.

DE 20 2005 010 524 U1 discloses a flat surface panel for suspended ceilings comprising a honeycomb compound plate with a perforated cover layer on the room-facing side. The surface panel may have the form of a thermal panel. Owing to the perforated cover layer facing the room, a particularly high sound absorption capacity of the thermal panel may be achieved. To further improve the sound absorption capacity, the room-facing side of the perforated cover layer of the honeycomb compound plate may additionally be provided with an acoustic fleece and/or an open-pore coating, for example an open-pore plaster or paint layer or an open-pore mineral coating. However, as explained above, a surface panel of this type may have the disadvantages that the thermal conduction between the acoustic fleece or the like and the perforated cover layer may be relatively low, and it may be difficult or even impossible to avoid that the perforations of the cover layer are visible through the acoustic fleece or the like.

GB 796,138 discloses a method of metallizing textiles, especially those made of cellulosic fibres, by exposing the textile material in a high vacuum to the vapour of metals, whereby the textile material so metallized is then heated at a temperature exceeding 100 degrees Celsius.

The object of the present invention is to provide a thermally activated building panel being thermally efficient and at the same time having a smooth and even textile surface without perforations being visible through the textile.

In view of this object, the textile is tensioned between opposed edges of the metal plate, and the first surface of the textile is metallized by deposition of metal particles on the textile.

By the deposition of metal particles on the textile, a thermally conductive metal coating may be integrated into the entire structure of the first surface of the textile, thereby vastly increasing the thermal conduction between the textile and the metal plate. By tensioning the textile between opposed edges of the metal plate and blocking the transmission of light through the textile by means of the metal coating integrated into the first surface of the textile, the textile surface may be evenly arranged, and the visibility of the perforations in the metal plate through the textile may effectively be prevented.

In an embodiment, the first surface of the textile is metallized by vacuum deposition of metal particles on the textile. Thereby, the materials to be vaporized can be solids in any form and purity. The vacuum coatings will generally contain only elements or molecules intentionally introduced in the deposition chamber, thereby ensuring high quality and reproducibility of the coatings.

In an embodiment, the first surface of the textile is metallized by deposition of metal particles on the textile in the form of ion plating. Thereby, a higher density and stronger adhesion of the coating may be achieved as compared to vacuum deposition.

In an embodiment, the first surface of the textile is metallized by deposition of metal particles on the textile in the form of electroplating. Thereby, a thick, stiff and heavy coating may be obtained.

In an embodiment, the first surface of the textile is metallized by deposition of metal particles on the textile in the form of electroless plating. Thereby, as compared to electroplating, the absence of electric field may contribute to a uniform thickness of the coating.

In an embodiment, the metal particles deposited on the textile are formed mainly or entirely by aluminium. Thereby, a relatively high thermal conductivity of the metal coating deposited on the first surface of the textile may be ensured, whereby the thermal conduction between the textile and the metal plate may be maximised. Furthermore, as aluminium is one of the most reflective metals in the world, a very effective blocking of the transmission of light through the textile by means of the metal coating may be achieved, whereby the visibility of the perforations in the metal plate through the textile may be even better prevented.

In an embodiment, the metal particles deposited on the textile forms a metal coating integrated into the structure of the first surface of the textile. Thereby, especially the thermal conductivity of the metal coating deposited on the first surface of the textile may be even further enhanced, because heat may be transported even better into or out of the internal structure of the textile.

In an embodiment, the metal particles deposited on the textile forms a metal coating generally having a maximum thickness of less than 1000 micrometres, preferably less than 750 micrometres, more preferably less than 500 micrometres, even more preferably less than 250 micrometres, even more preferably less than 150 micrometres, even more preferably less than 50 micrometres, and most preferably less than 25 micrometres.

In an embodiment, the metal particles deposited on the textile forms a metal coating generally having a minimum thickness of more than 500 nanometres, preferably more than 750 nanometres, and most preferably more than 1000 nanometres.

In an embodiment, the metal particles deposited on the textile forms a metal coating having a weight of less than 300 milligrams per square metre, preferably less than 200 milligrams per square metre, more preferably less than 100 milligrams per square metre, even more preferably less than 50 milligrams per square metre, even more preferably less than 30 milligrams per square metre, even more preferably less than 10 milligrams per square metre, and most preferably less than 5 milligrams per square metre.

In an embodiment, the metal particles deposited on the textile forms a metal coating having a weight of more than 100 micrograms per square metre, preferably more than 200 micrograms per square metre, and most preferably more than 300 micrograms per square metre.

In an embodiment, the metal plate is arranged within a frame composed by profile members, each profile member has a rounded outer edge connecting a room-facing side of the profile member with a building-facing side of the profile member, the textile is bent about the rounded outer edges of the profile members, and an edge of the textile is fixed preferably resiliently by means of at least one spring member to the building-facing side of the profile members. Thereby, the tensioning the textile between opposed edges of the metal plate may be optimised, whereby the visibility of the perforations in the metal plate through the textile may be even better prevented. Furthermore, when seen from the room side, the metal plate may be entirely hidden within the textile.

In a structurally particularly advantageous embodiment, each edge of the textile is provided with a bracket arranged in a track in the building-facing side of the corresponding profile member, and the bracket is spring-biased sideward in the track in order to tension the textile between the opposed edges of the metal plate. Thereby, the tensioning the textile between opposed edges of the metal plate may be even further optimised, whereby the visibility of the perforations in the metal plate through the textile may be even better prevented.

In a structurally particularly advantageous embodiment, each edge of the metal plate is arranged in a recess of a corresponding profile member so that the room-facing surface of the metal plate is flush with a part of the room-facing side of said profile member forming a smooth transition with the rounded outer edge of said profile member.

In an embodiment, each profile member does not extend across the plane of the room-facing surface of the metal plate. Thereby, it may be ensured that the textile is abutting the metal plate evenly, whereby an even smoother generally room-facing second surface of the textile may be ensured.

In an embodiment, the metal plate is perforated to allow transmission of sound waves from the room into an acoustically absorptive panel behind.

In an embodiment, the metal plate is deformed to a create a three dimensional bow larger than the natural sag of the tensioned textile to ensure contact between said plate and textile. Thereby, an even smoother generally room-facing second surface of the textile may be ensured.

In an embodiment, the metal plate is formed to a three dimensional profile to guide the textile into an engineered shape once tensioned.

In an embodiment, the second surface of the textile is at least substantially free from metal particles. By maintaining the generally room-facing second surface of the textile at least substantially free from metal particles, the thermal radiation between the textile and the room may also be increased or optimised, and furthermore, an ample choice between different textile surface structures and colours may exist.

The invention will now be explained in more detail below by means of examples of embodiments with reference to the very schematic drawing, in which.

Figure 1:
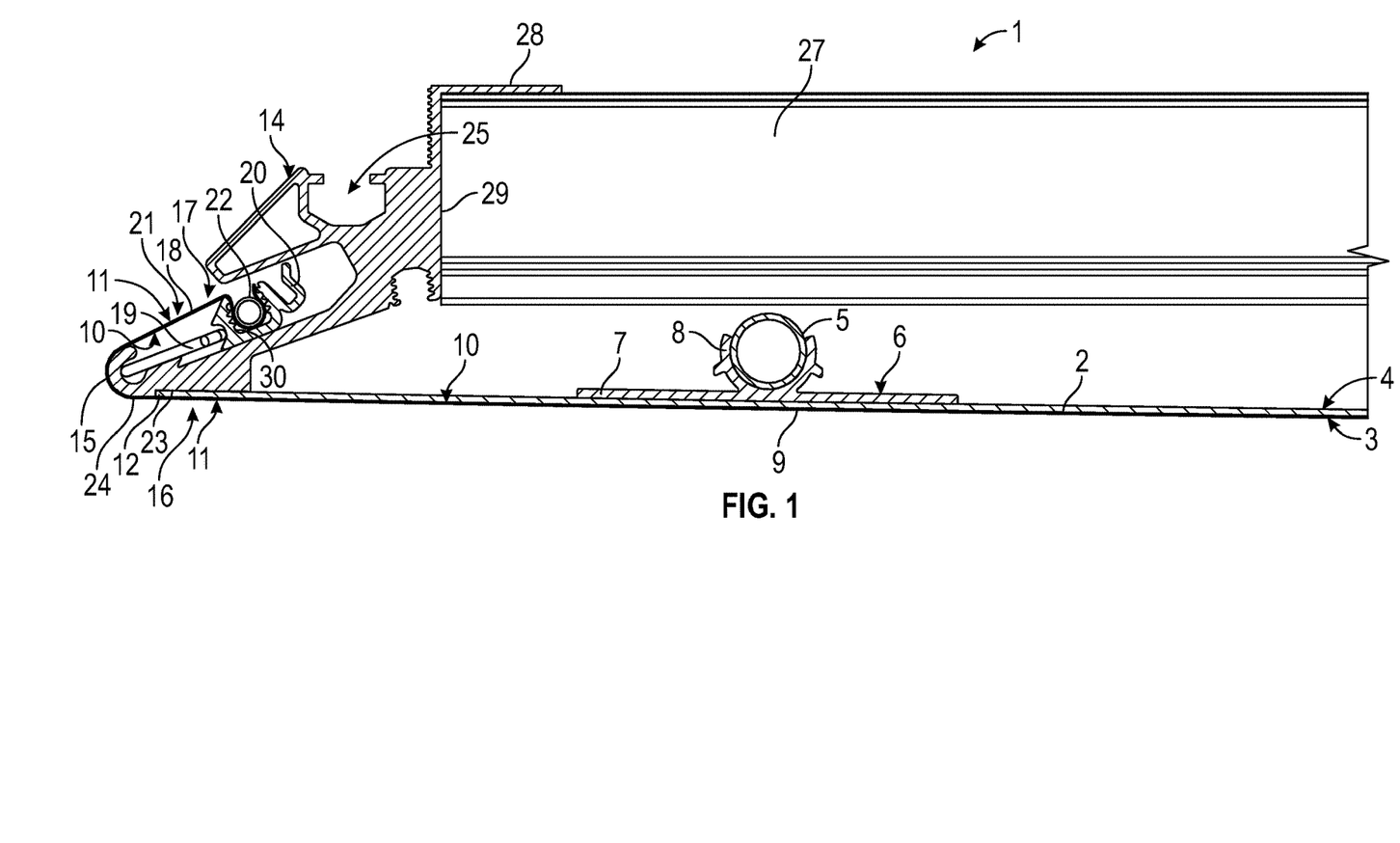
FIG. 1 is a cross-sectional view through part of an embodiment of a thermally activated building panel according to the invention.
Figure 2:
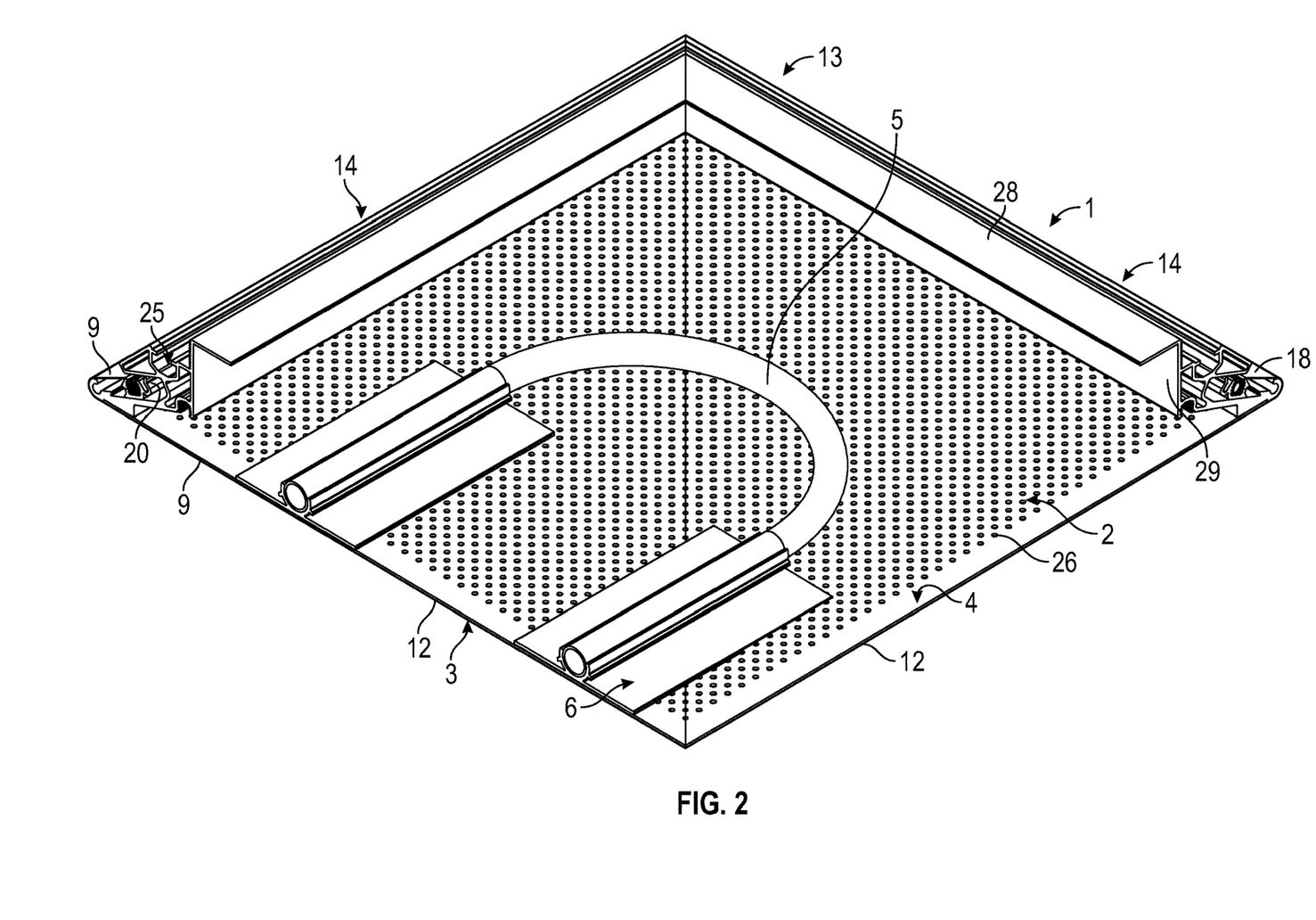
FIG. 2 is a perspective view seen from above of the part of a thermally activated building panel of FIG. 1.
Figure 3:
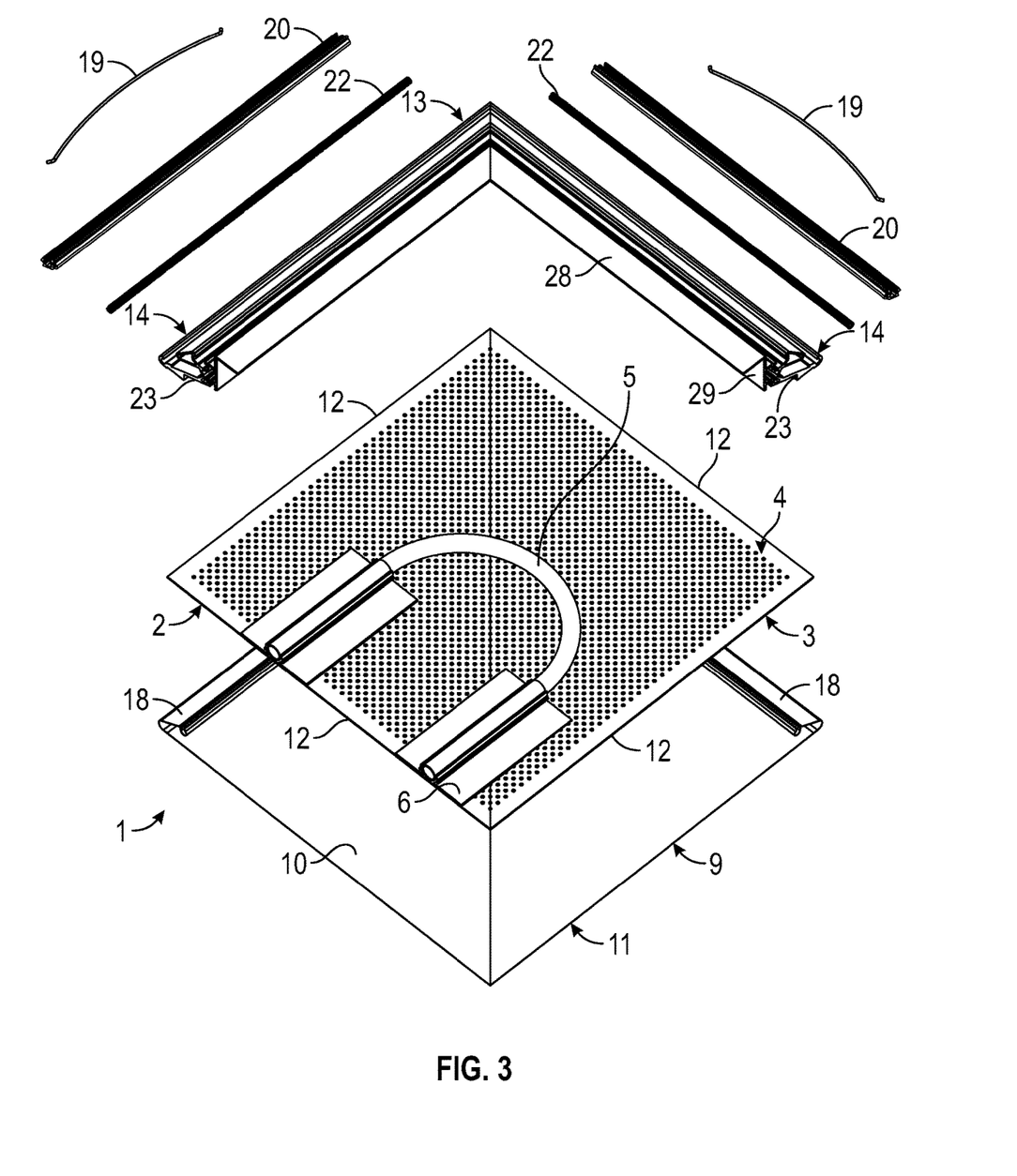
FIG. 3 is an exploded view of the part of a the thermally activated building panel of FIG. 1.
Figure 4:
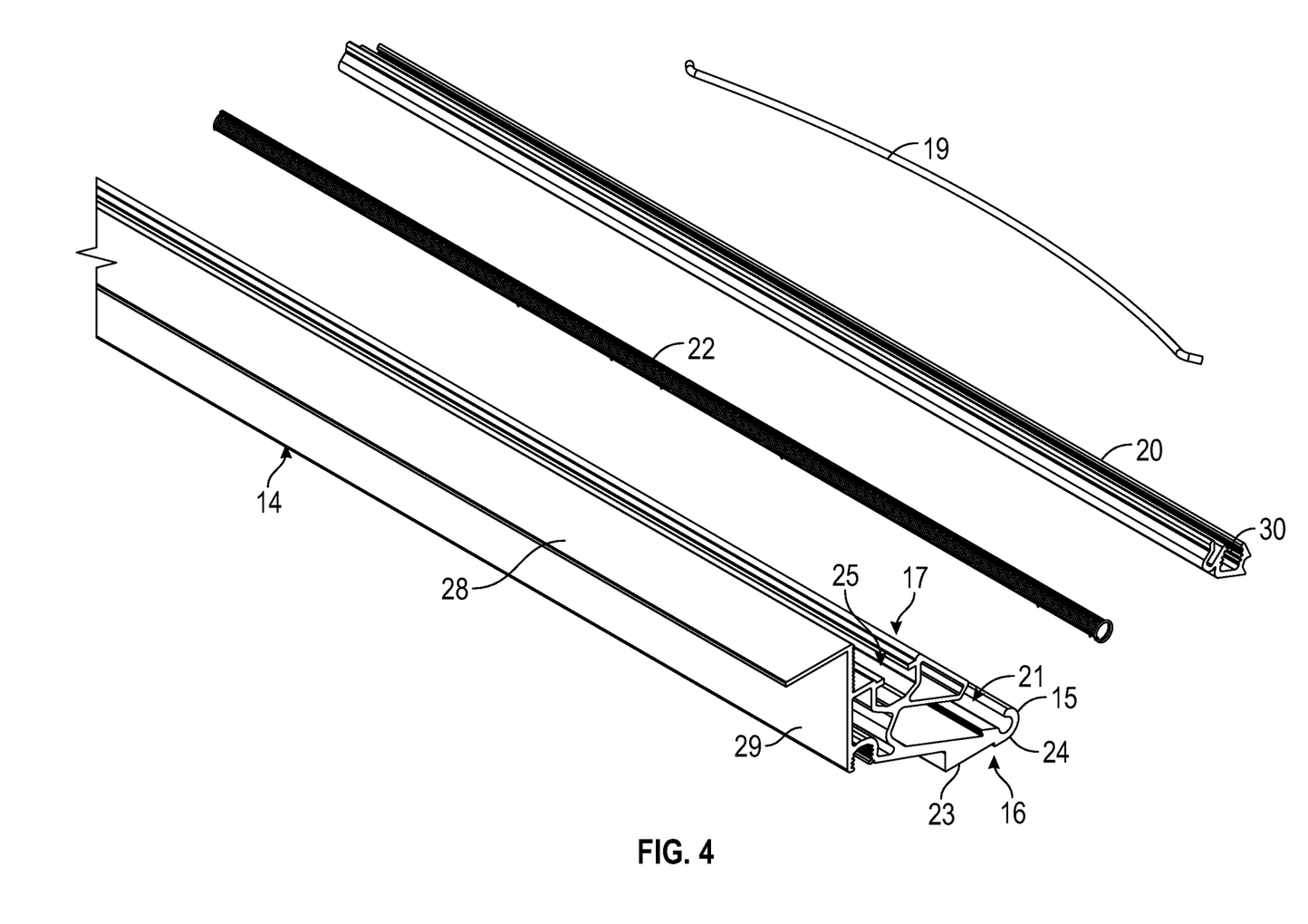
FIG. 4 is an exploded view of part of a profile member of the thermally activated building panel of FIG. 1.
Figure 5:
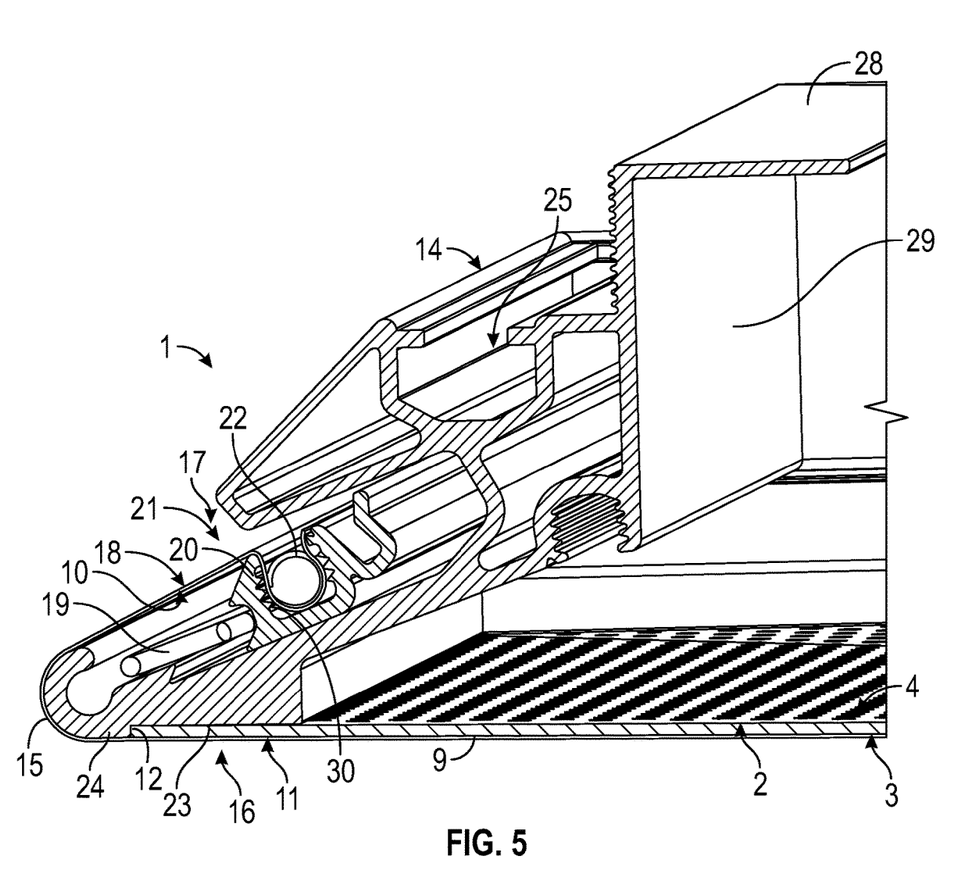
FIG. 5 is a perspective cross-sectional view of part of a profile member of the thermally activated building panel of FIG. 1.

FIGS. 1 and 2 illustrate part of an embodiment of a thermally activated building panel 1 according to the invention. The thermally activated building panel 1 is adapted to be mounted at a not shown ceiling or wall of a room in order to provide predominantly radiant heating or cooling of the room. The thermally activated building panel 1 includes a metal plate 2 having a room-facing surface 3 and a building-facing surface 4. A heat-exchanger tube 5 for conveying a cooling or heating medium is in conductive thermal contact with the building-facing surface 4 of the metal plate 2 in order to control the temperature of the metal plate 2 which may then exchange heat with the surrounding environment in the room through convection and predominantly radiation. The heat-exchanger tube 5 is mounted on the building-facing surface 4 of the metal plate 2 by means of a thermally conductive bracket 6. The thermally conductive bracket 6 has a flat part 7 with a lower side which is mounted directly flat on the building-facing surface 4 of the metal plate 2. Furthermore, the thermally conductive bracket 6 has a partly round part 8 integrated on an upper side of the flat part 7 and having an upper opening for insertion of the heat-exchanger tube 5 which fits snugly into the partly round part 8. Thereby, effective conductive thermal contact is provided between the heat-exchanger tube 5 and the metal plate 2.

A textile 9 is arranged on the room-facing surface 3 of the metal plate 2 and has a first surface 10 generally contacting the metal plate 2 and a second surface 11 generally visible from said room. The textile 9 is tensioned between opposed edges 12 of the metal plate 2. In order to provide efficient thermal conduction between the textile 9 and the metal plate 2, the first surface 10 of the textile 9 is metallized by deposition of metal particles on the textile 9. Furthermore, in an embodiment, in order to ensure efficient thermal radiation between the textile 9 and the room, the second surface 11 of the textile 9 is at least substantially free from metal particles. Thereby may also be provided an ample choice between different textile surface structures and colours.

In order to provide acoustical attenuation in the room, in the embodiment illustrated in the figures, a number of perforations 26 are arranged in the metal plate 2 for sound access from the room-facing surface 3 to the building-facing surface 4 of the metal plate 2. The perforated metal plate 2 may allow transmission of sound waves from the room into a not shown acoustically absorptive panel behind. The number, size and shapes of these perforations 26 together with the volume of the cavity above the building-facing surface 4 of the metal plate 2 and the possible presence and acoustical properties of not shown damping material within said cavity may affect the acoustical attenuation properties of the thermally activated building panel 1. Furthermore, the acoustical attenuation properties can be affected by appropriate choice of the structure of the textile 9, and acoustical attenuation of sound waves impinging on the room-facing surface 3 of the metal plate 2 can thus be achieved, especially at higher frequencies as is well known per se.

Preferably, the first surface 10 of the textile 9 is metallized by vacuum deposition of metal particles on the textile 9, although different methods of coating may be employed, such as spraying.

Vacuum coatings will contain at least substantially only elements or molecules intentionally introduced in the deposition chamber in which the vacuum deposition of metal particles on the textile 9 is performed, thereby ensuring high quality and reproducibility of the coatings.

Vacuum deposition is also known as vacuum metallization and is a process whereby material from a thermal vaporization source reaches the textile 9 without collision with gas molecules in the space between the source and the textile 9. It may be carried out by evaporation of metal materials with heat and the condensing of metallic vapours onto the textile surface in a partial or full vacuum. By using vacuum deposition, the materials to be vaporized can be solids in any form and purity. By comparison, it is noted that whereas by textile metallization, metallic particles are deposited on textile surfaces, thereby creating metallic-coated fabrics, on the other hand, by what is generally known as metal application, metallic materials, such as metal threads, metallic foils, sheet metals, are attached directly onto fabrics to achieve glistening effects. By textile metallization, the basic textile materials are retained, such as appearance, e.g. As mentioned above, according to the present invention, the textile 9 is metallized by vacuum deposition of metal particles on the textile 9.

Alternatively, the first surface 10 of the textile 9 is metallized by ion plating of metal particles on the textile 9. Ion plating is a physical vapour deposition technique whereby a metal coating is produced by the adhesion of evaporated metal particles onto the textile. Textiles to be coated are located in an inert gas with metal materials by the application of heating and a low-velocity arc in order to evaporate the molecules of the metal materials. The metal coating is the generated by the bombardment of accelerated ionized metal particles on the textile surface. This technology may have higher density and stronger adhesion when compared to vacuum deposition.

Alternatively, the first surface 10 of the textile 9 is metallized by electroplating, also known as electro-deposition, of metal particles on the textile 9. By electroplating electrically conductive textile materials are coated with a layer of metal particles by means of electrical current. It may produce a thick, stiff and heavy coat of metal on textiles. The electroplating process is performed in an electrolytic cell which contains an electrolyte and two electrodes. The anode (positive electrolyte) is formed by the coating metal, while the cathode (negative electrolyte) is the part to be coated.

Alternatively, the first surface 10 of the textile 9 is metallized by electroless plating of metal particles on the textile 9.

Preferably, the metal particles deposited on the textile 9 are formed mainly or entirely by aluminium. Thereby, a relatively high thermal conductivity of the metal coating deposited on the first surface 10 of the textile 9 may be ensured, whereby the thermal conduction between the textile 9 and the metal plate 2 may be maximised. Furthermore, as aluminium is one of the most reflective metals in the world, a very effective blocking of the transmission of light through the textile 9 by means of the metal coating may be achieved, whereby the visibility of the perforations 26 in the metal plate 2 through the textile 9 may be even better prevented.

Preferably, the metal particles deposited on the textile 9 forms a metal coating integrated into the structure of the first surface 10 of the textile 9. Thereby, especially the thermal conductivity of the metal coating deposited on the first surface 10 of the textile 9 may be even further enhanced, because heat may be transported even better into or out of the internal structure of the textile 9.

In an embodiment, the metal particles deposited on the textile 9 forms a metal coating generally having a maximum thickness of less than 1000 micrometres, preferably less than 750 micrometres, more preferably less than 500 micrometres, even more preferably less than 250 micrometres, even more preferably less than 150 micrometres, even more preferably less than 50 micrometres, and most preferably less than 25 micrometres.

In an embodiment, the metal particles deposited on the textile 9 forms a metal coating generally having a minimum thickness of more than 500 nanometres, preferably more than 750 nanometres, and most preferably more than 1000 nanometres.

In an embodiment, the metal particles deposited on the textile 9 forms a metal coating having a weight of less than 300 milligrams per square metre, preferably less than 200 milligrams per square metre, more preferably less than 100 milligrams per square metre, even more preferably less than 50 milligrams per square metre, even more preferably less than 30 milligrams per square metre, even more preferably less than 10 milligrams per square metre, and most preferably less than 5 milligrams per square metre.

In an embodiment, the metal particles deposited on the textile 9 forms a metal coating having a weight of more than 100 micrograms per square metre, preferably more than 200 micrograms per square metre, and most preferably more than 300 micrograms per square metre.

As illustrated partly in FIGS. 1 and 2, the metal plate 2 is arranged within a frame 13 composed by profile members 14. Each profile member 14 has a rounded outer edge 15 connecting a room-facing side 16 of the profile member 14 with a building-facing side 17 of the profile member 14. The textile 9 is bent about the rounded outer edges 15 of the profile members 14, and an edge 18 of the textile 9 is fixed resiliently by means of at least one spring member 19 to the building-facing side 17 of the profile members 14. Each edge 18 of the textile 9 is provided with a bracket 20 arranged in a track 21 in the building-facing side 17 of the corresponding profile member 14, and the bracket 20 is spring-biased sideward in the track 21 by means of the least one spring member 19 in order to tension the textile 9 between the opposed edges 12 of the metal plate 2. The spring member 19 has the form of an elongated flexible hoop. As illustrated in the figures, the edge 18 of the textile 9 is fixed in a serrated track 30 extending longitudinally in the bracket 20 in that a retaining member 22 in the form of a spring is pressed into the serrated track 30, thereby pinching the textile edge 18 against the serrated walls of the serrated track 30.

As illustrated in the figures, each edge 12 of the metal plate 2 is arranged in a recess 23 of a corresponding profile member 14 so that the room-facing surface 3 of the metal plate 2 is flush with a part 24 of the room-facing side 16 of said profile member 14. Said part 24 forms a smooth transition with the rounded outer edge 15 of said profile member 14. Furthermore, it is noted that each profile member 14 does not extend across the plane of the room-facing surface 3 of the metal plate 2, i.e., said part 24 being flush with the metal plate 2 extends as a continuation of the room-facing surface 3 of the metal plate 2 until it reaches the rounded outer edge 15 with which it is integrated. Thereby, it may be ensured that the textile 9 is abutting the metal plate 2 evenly, whereby an even smoother generally room-facing second surface 11 of the textile 9 may be ensured.

The frame 13 composed by profile members 14 may be arranged on and around a central element 27 of the thermally activated building panel 1 in that each profile member 14 has an upper mounting flange 28 gripping over a top surface of said central element 27 and an inner wall 29 abutting a side face of said central element 27.

The frame 13 composed by profile members 14 may be mounted at the not shown ceiling or wall of the room by means of appropriate not shown mounting brackets mounted on said ceiling or wall and engaging a mounting track 25 of each profile member 14 as illustrated in FIG. 1.

The textile 9 tensioned between opposed edges 12 of the metal plate 2 may be a nonwoven or woven fabric in the form of a flexible material formed by natural or artificial fibres, yarn or thread. The textile 9 is preferably of a material or structure that allows air to diffuse through it.

In an embodiment, the metal plate 2 is deformed to a create a three dimensional bow larger than the natural sag of the tensioned textile to ensure contact between said plate 2 and textile 9.

In an embodiment, the metal plate 2 is formed to a three dimensional profile to guide the textile 9 into an engineered shape once tensioned.

Comparative Test Results

Figure 6:
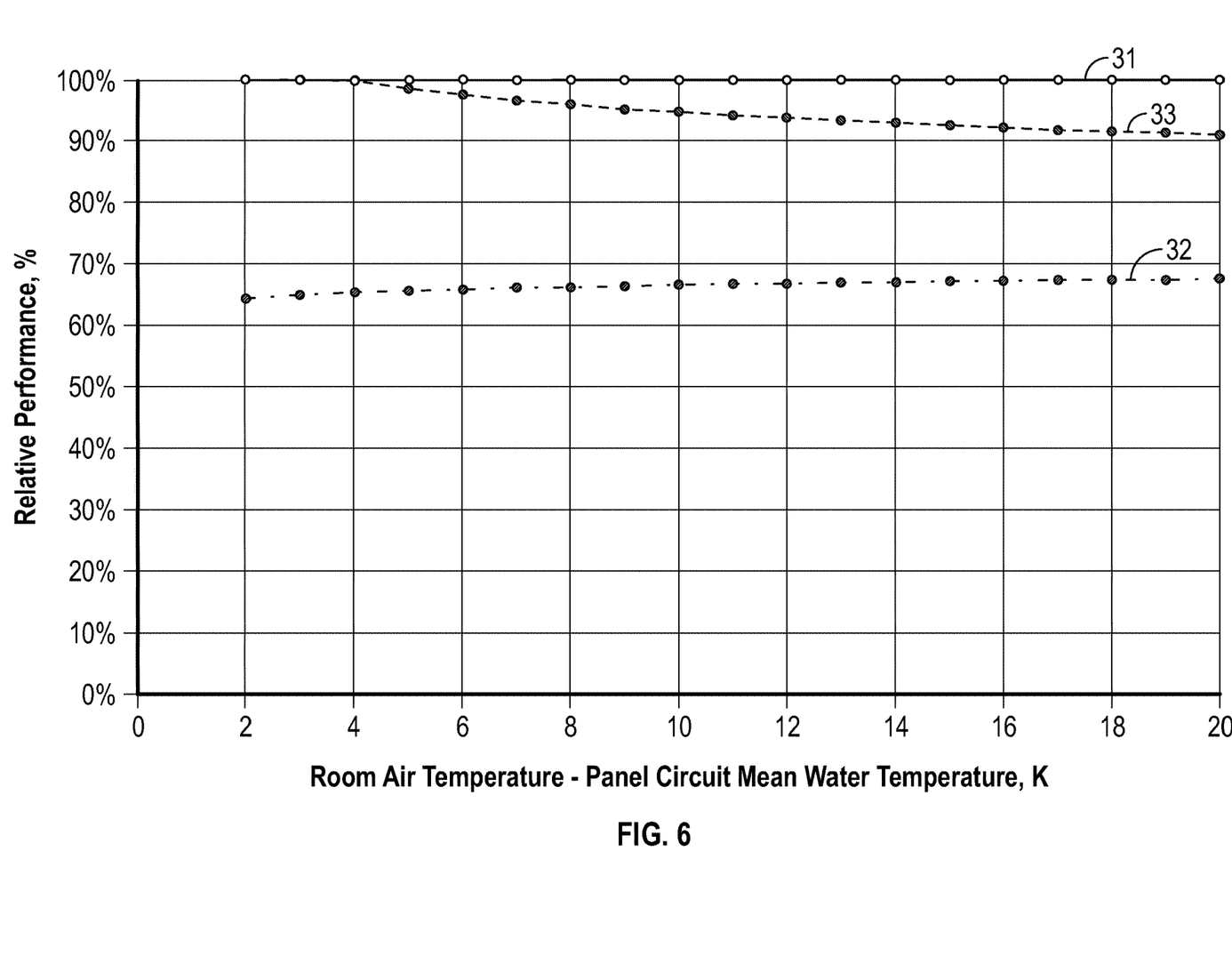
FIG. 6 illustrate comparative test results demonstrating the thermal performance of a thermally activated building panel according to the invention.

FIG. 6 illustrates in a graph the relative thermal performance of a thermally activated building panel according to the invention as compared to a prior art panel without textile and a panel with uncoated textile, respectively. The X axis of the graph indicates the difference between the room air temperature and the mean temperature of water circulating through the heat-exchanger tubes of the thermally activated building panels. The Y axis of the graph indicates the relative performance in percent.

As indicated by the curve 31 in FIG. 6, the measured relative performance of a prior art thermally activated building panel without any textile covering the metal plate is set to 100%. Furthermore, the curve 32 indicates the measured relative performance of a thermally activated building panel in which the metal plate is covered by a tensioned textile which is not coated by any metal. As it is seen, the relative performance of the latter panel is substantially reduced to between 65 and 67% of the relative performance of the prior art thermally activated building panel without any textile. Eventually, the curve 33 indicates the measured relative performance of a thermally activated building panel according to the present invention in which the metal plate is covered by a tensioned textile, wherein the first surface 10 of the textile 9 generally contacting the metal plate is metallized by deposition of aluminium particles on the textile 9, and wherein the second surface 11 of the textile 9 generally visible from the room is at least substantially free from metal particles. As it is seen, the relative performance of the thermally activated building panel according to the present invention is only slightly reduced to between 91 and 100% of the relative performance of the prior art thermally activated building panel without any textile. Concluding, the comparative test results show that according to the invention, it is possible to provide a thermally activated building panel with a smooth and even textile surface and still achieve an efficient thermal performance. Another result of the comparative test which is not illustrated in FIG. 6 is that the perforations 26 in the metal plate 2 of the thermally activated building panel according to the present invention are not visible through the textile, whereas for the tested thermally activated building panel in which the metal plate is covered by a tensioned textile which is not coated by any metal, the perforations are indeed visible through the textile. It is noted that there are no other differences than the metallization of the textile between the two different thermally activated building panels indicated by the curves 32, 33, respectively.

LIST OF REFERENCE NUMBERS

1 thermally activated building panel
2 metal plate
3 room-facing surface of metal plate
4 building-facing surface metal plate
5 heat-exchanger tube
6 thermally conductive bracket
7 flat part of thermally conductive bracket
8 partly round part of thermally conductive bracket
9 textile
10 first surface of textile
11 second surface of textile
12 opposed edges of metal plate
13 frame
14 profile member
15 rounded outer edge of profile member
16 room-facing side of profile member 17 building-facing side of profile member
18 edge of textile
19 spring member
20 bracket
21 track
22 retaining member
23 recess
24 part of room-facing side of profile member
25 mounting track of profile member
26 perforation in metal plate
27 central element of thermally activated building panel
28 mounting flange of profile member
29 inner wall of profile member
30 serrated track of bracket
31 relative performance of prior art panel without textile
32 relative performance of panel with uncoated textile
33 relative performance of panel according to the invention with metal-coated textile

The invention claimed is:

1. A thermally activated building panel (1) adapted to be mounted at a ceiling or wall of a room, comprising:
    a metal plate (2) having a room-facing surface (3) and a building-facing surface (4), wherein the metal plate (2) is arranged within a frame (13) composed by profile members (14), wherein each profile member (14) has a rounded outer edge (15) connecting a room-facing side (16) of the profile member (14) with a building-facing side (17) of the profile member (14),
    wherein a heat-exchanger tube (5) for conveying a cooling or heating medium is in conductive thermal contact with the building-facing surface (4) of the metal plate (2),
    wherein a textile (9) is arranged on the room-facing surface (3) of the metal plate (2), the textile (9) having a first surface (10) generally contacting the metal plate (2) and a second surface (11) generally visible from said room, wherein the textile (9) is bent about the rounded outer edges (15) of the profile members (14), and wherein an edge (18) of the textile (9) is fixed resiliently by means of at least one spring member (19) to the building-facing side (17) of the profile members (14), wherein each edge (18) of the textile (9) is provided with a bracket (20) arranged in a track (21) in the building-facing side (17) of the corresponding profile member (14), and wherein the bracket (20) is spring-biased sideward in the track (21) in order to tension the textile (9) between opposed edges (12) of the metal plate (2), and
    wherein the first surface (10) of the textile (9) is metallized with metal particles on the textile (9), and wherein the metal particles on the textile (9) contact the metal plate (2) by tensioning the textile (9), which is separate from the metal plate (2), between the opposed edges (12) of the metal plate (2).

2. A thermally activated building panel according to claim 1, wherein the first surface (10) of the textile (9) is metallized by ion plating, electroplating or electroless plating.

3. A thermally activated building panel according to claim 1, wherein the first surface (10) of the textile (9) is metallized by vacuum deposition.

4. A thermally activated building panel according to claim 1, wherein the metal particles deposited on the textile (9) are aluminium.

5. A thermally activated building panel according to claim 1, wherein the metal particles deposited on the textile (9) forms a metal coating integrated into a structure of the first surface (10) of the textile (9).

6. A thermally activated building panel according to claim 1, wherein the metal particles deposited on the textile (9) forms a metal coating generally having a maximum thickness of less than 1000 micrometres.

7. A thermally activated building panel according to claim 1, wherein the metal particles deposited on the textile (9) forms a metal coating generally having a minimum thickness of more than 500 nanometres.

8. A thermally activated building panel according to claim 1, wherein the metal particles deposited on the textile (9) forms a metal coating having a weight of less than 300 milligrams per square metre.

9. A thermally activated building panel according to claim 1, wherein the metal particles deposited on the textile (9) forms a metal coating having a weight of more than 100 micrograms per square metre.

10. A thermally activated building panel according to claim 1, wherein the metal plate (2) is perforated to allow transmission of sound waves from the room into an acoustically absorptive panel behind.

11. A thermally activated building panel according to claim 1, wherein the second surface (11) of the textile (9) is at least substantially free from the metal particles.

12. A thermally activated building panel (1) adapted to be mounted at a ceiling or wall of a room, comprising:
    a metal plate (2) having a room-facing surface (3) and a building-facing surface (4), wherein the metal plate (2) is arranged within a frame (13) composed by profile members (14), wherein each profile member (14) has a rounded outer edge (15) connecting a room-facing side (16) of the profile member (14) with a building-facing side (17) of the profile member (14), wherein each edge (12) of the metal plate (2) is arranged in a recess (23) of a corresponding profile member (14) so that the room-facing surface (3) of the metal plate (2) is flush with a part (24) of the room-facing side (16) of said profile member (14) forming a smooth transition with the rounded outer edge (15) of said profile member (14),
    wherein a heat-exchanger tube (5) for conveying a cooling or heating medium is in conductive thermal contact with the building-facing surface (4) of the metal plate (2),
    wherein a textile (9) is arranged on the room-facing surface (3) of the metal plate (2), the textile (9) having a first surface (10) generally contacting the metal plate (2) and a second surface (11) generally visible from said room, wherein the textile (9) is bent about the rounded outer edges (15) of the profile members (14), and wherein an edge (18) of the textile (9) is fixed resiliently by means of at least one spring member (19) to the building-facing side (17) of the profile members (14), and
    wherein the first surface (10) of the textile (9) is metallized with metal particles on the textile (9), and wherein the metal particles on the textile (9) contact the metal plate (2) by tensioning the textile (9), which is separate from the metal plate (2), between opposed edges (12) of the metal plate (2).

13. A thermally activated building panel according to claim 12, wherein each profile member (14) does not extend across a plane of the room-facing surface (3) of the metal plate (2).

14. A thermally activated building panel (1) adapted to be mounted at a ceiling or wall of a room, comprising:
    a metal plate (2) having a room-facing surface (3) and a building-facing surface (4), wherein the metal plate (2)

is arranged within a frame (13) composed by profile members (14), wherein each profile member (14) has a rounded outer edge (15) connecting a room-facing side (16) of the profile member (14) with a building-facing side (17) of the profile member (14), wherein a heat-exchanger tube (5) for conveying a cooling or heating medium is in conductive thermal contact with the building-facing surface (4) of the metal plate (2), and wherein a textile (9) is arranged on the room-facing surface (3) of the metal plate (2), the textile (9) having a first surface (10) generally contacting the metal plate (2) and a second surface (11) generally visible from said room, wherein the textile (9) is bent about the rounded outer edges (15) of the profile members (14), and wherein an edge (18) of the textile (9) is fixed resiliently by means of at least one spring member (19) to the building-facing side (17) of the profile members (14), wherein each edge (18) of the textile (9) is provided with a bracket (20) arranged in a track (21) in the building-facing side (17) of the corresponding profile member (14), wherein the bracket (20) is spring-biased sideward in the track (21) in order to tension the textile (9) between opposed edges (12) of the metal plate (2), and wherein the textile (9) is tensioned between the opposed edges (12) of the metal plate (2), and the first surface (10) of the textile (9) is metallized by deposition of metal particles on the textile (9).

15. A thermally activated building panel according to claim 14, wherein each edge (12) of the metal plate (2) is arranged in a recess (23) of a corresponding profile member (14) so that the room-facing surface (3) of the metal plate (2) is flush with a part (24) of the room-facing side (16) of said profile member (14) forming a smooth transition with the rounded outer edge (15) of said profile member (14).

\* \* \* \* \*